(12) United States Patent
Huang et al.

(10) Patent No.: US 10,780,652 B2
(45) Date of Patent: Sep. 22, 2020

(54) PRINTING METHOD FOR COLOR COMPENSATION OF 3D PRINTER

(71) Applicants: XYZPRINTING, INC., New Taipei (TW); KINPO ELECTRONICS, INC., New Taipei (TW)

(72) Inventors: Yu-Ting Huang, New Taipei (TW); Hsin-Ta Hsieh, New Taipei (TW)

(73) Assignees: XYZPRINTING, INC., New Taipei (TW); KINPO ELECTRONICS, INC., New Taipei (TW)

( * ) Notice: Subject to any disclaimer, the term of this patent is extended or adjusted under 35 U.S.C. 154(b) by 45 days.

(21) Appl. No.: 15/603,448

(22) Filed: May 24, 2017

(65) Prior Publication Data

US 2018/0186096 A1 Jul. 5, 2018

(30) Foreign Application Priority Data

Jan. 5, 2017 (TW) .............................. 106100299 A

(51) Int. Cl.
*B29C 67/00* (2017.01)
*B33Y 50/00* (2015.01)
(Continued)

(52) U.S. Cl.
CPC ........ *B29C 67/0007* (2013.01); *B29C 64/112* (2017.08); *B29C 64/194* (2017.08);
(Continued)

(58) Field of Classification Search
CPC .... B29C 64/112; B29C 67/0007; B33Y 50/00
(Continued)

(56) References Cited

U.S. PATENT DOCUMENTS 6,799,959 B1 10/2004 Tochimoto et al.
7,417,768 B1 * 8/2008 Donovan ............. G06K 15/102
358/2.1
(Continued)

FOREIGN PATENT DOCUMENTS

CN 102555027 A 7/2012
EP 3112173 A1 * 1/2017 ........... H04N 1/6002
(Continued)

OTHER PUBLICATIONS

Search Report dated Dec. 5, 2017 of the corresponding European patent application No. 17171081.7.
(Continued)

*Primary Examiner* — Tri V Nguyen
(74) *Attorney, Agent, or Firm* — Chun-Ming Shih; HDLS IPR Services

(57) ABSTRACT

A printing method for color compensation adopted by a 3D printer (1) having a 3D nozzle (121) and a 2D nozzle (122) is disclosed. The printing method includes following steps of: controlling the 3D nozzle (121) to print a slicing object (2) of the 3D object upon a printing platform (11) according to a route file; controlling the 2D nozzle (122) to perform coloring on the printed slicing object (2) according to an image file; controlling the 2D nozzle (122) and the printing platform (1) to rotate relatively for creating an angular transposition between the 2D nozzle (122) and the printing platform (1) after the slicing object (2) is colored completely; and, controlling the 2D nozzle (122) to again perform coloring on the colored slicing object (2) after the 2D nozzle (2) and the printing platform (11) rotated relatively.

10 Claims, 8 Drawing Sheets

(51) Int. Cl.
    *B29C 64/112* (2017.01)
    *H04N 1/58* (2006.01)
    *B33Y 40/00* (2020.01)
    *B33Y 10/00* (2015.01)
    *B29C 64/386* (2017.01)
    *B29C 64/194* (2017.01)

(52) U.S. Cl.
    CPC ............ *B29C 64/386* (2017.08); *B33Y 10/00* (2014.12); *B33Y 40/00* (2014.12); *B33Y 50/00* (2014.12); *H04N 1/58* (2013.01)

(58) Field of Classification Search
    USPC ..................................... 347/43, 47; 264/40.1
    See application file for complete search history.

(56) References Cited

U.S. PATENT DOCUMENTS

| | | | | |
|---|---|---|---|---|
| 2014/0277661 | A1* | 9/2014 | Amadio | B29C 67/0088 |
| | | | | 700/97 |
| 2015/0154321 | A1* | 6/2015 | Schmidt | G05B 19/4099 |
| | | | | 700/98 |
| 2015/0343704 | A1 | 12/2015 | Stahl et al. | |
| 2016/0096324 | A1 | 4/2016 | Giller | |
| 2016/0297150 | A1 | 10/2016 | Ueda | |
| 2017/0341304 | A1* | 11/2017 | Miller | B33Y 10/00 |

FOREIGN PATENT DOCUMENTS

| | | |
|---|---|---|
| JP | S61216762 A | 9/1986 |
| JP | 2001018297 A | 1/2001 |
| JP | 2006130906 A | 5/2006 |
| JP | 2008074089 A | 4/2008 |
| WO | 2015107789 A1 | 7/2015 |
| WO | 2016003277 A1 | 1/2016 |

OTHER PUBLICATIONS

Office Action dated Jun. 19, 2019 of the corresponding Taiwan patent application No. 106100299.

Office Action dated Dec. 17, 2019 of the corresponding Japan patent application.

Office Action dated Dec. 19, 2019 of the corresponding Korean patent application.

* cited by examiner

PRINTING METHOD FOR COLOR COMPENSATION OF 3D PRINTER

BACKGROUND OF THE INVENTION

1. Technical Field

The technical field relates to a printing method of 3D printer, and specifically relates to a printing method for color compensation of 3D printer.

2. Description of Related Art

Due to the maturity of the development of 3D printing technology and also the narrowed size and dropped price of the current 3D printers, the 3D printers are growing and becoming popular very quick these years. Additionally, for making the printed 3D models more acceptable to the users, parts of the manufacturers have brought new types of 3D printers to the market that can print full-colored 3D models.

In related art, the 3D printer mentioned above is first jetting the material according to a route file of a printing layer when performing printing, so as to print a slicing object corresponding to the printing layer. Next, the 3D printer jets color ink on the printed slicing object according to an image file of the printing layer, so as to perform coloring on the slicing object. According to the aforementioned printing action and coloring action, the 3D printer can ultimately generate a full-colored 3D model by stacking multiple colored slicing objects.

The aforementioned 3D printer basically uses the ink nozzle adopted by the current 2D printer to jet color ink. Generally speaking, the ink nozzle may connect with multiple ink cartridges that respectively store different colors of inks.

Though the ink nozzle can move arbitrarily along an X axis, a Y axis, and a Z axis of the 3D printer according to the structure of the 3D printer, the ink nozzle can only jet the inks along a single direction because of the arranged positions of multiple spraying heads on the ink nozzle. In particular, the ink nozzle can only jet the inks along the X axis, or only jet the inks along the Y axis, so as to jet different colors of inks and mixes these inks for generating desired colors.

Because the ink nozzle is jetting ink while it moves, the jetted ink will a bit deviate from the position indicated by the image file due to inertia. Besides, after the jetted ink is absorbed by the slicing object, it may cause a diffusion phenomenon due to the character of the material. In this case, multiple blind gaps will be created among multiple colored points of the colored slicing object, and cause an uneven coloring situation. When multiple colored slicing objects are printed and stacked, a special vein will be created through the multiple blind gaps of the multiple slicing objects, and the special vein is created along a jetting direction of the ink nozzle. The special vein is as the depiction in FIG. 6 and FIG. 7, wherein FIG. 6 is a schematic view showing a full-colored 3D model colored by the ink nozzle along an X axis, and FIG. 7 is a schematic view showing another full-colored 3D model colored by the ink nozzle along a Y axis.

The ink nozzle in the related art can only move and jet ink along the same direction, it has the exactly same jetting direction and jetting position, so the inertia and the diffusion phenomenon caused by the ink nozzle are always the same. Even if the related art performs multiple coloring actions on the same slicing object repeatedly, it may not prevent the special vein from appearing. Therefore, the appearance of the colored 3D model will be seriously affected.

SUMMARY OF THE INVENTION

The invention is directed to a printing method for color compensation of 3D printer, which may perform several times of coloring actions on same slicing object, so as to color the slicing object evenly, and prevent coloring-gaps from being created.

In one of the exemplary embodiments, the method of the present invention is adopted by a 3D printer that has a 3D nozzle and a 2D nozzle, and the method comprises following steps: controlling the 3D nozzle to print a slicing object of the 3D object upon a printing platform according to a route file; controlling the 2D nozzle to perform coloring on the printed slicing object according to an image file; controlling the 2D nozzle and the printing platform to rotate relatively for creating an angular transposition between the 2D nozzle and the printing platform after the slicing object is colored completely; and, controlling the 2D nozzle to again perform coloring on the colored slicing object after the 2D nozzle and the printing platform rotated relatively.

In comparison with related art, the embodiments of the present invention may perform several times of coloring actions on same slicing object along different directions, so as to make the color of the slicing object more even, and prevent coloring-gaps from being created on the slicing object.

DETAILED DESCRIPTION OF THE INVENTION

In cooperation with the attached drawings, the technical contents and detailed description of the present invention are described thereinafter according to multiple embodiments, being not used to limit its executing scope. Any equivalent variation and modification made according to appended claims is all covered by the claims claimed by the present invention.

Figure 1:
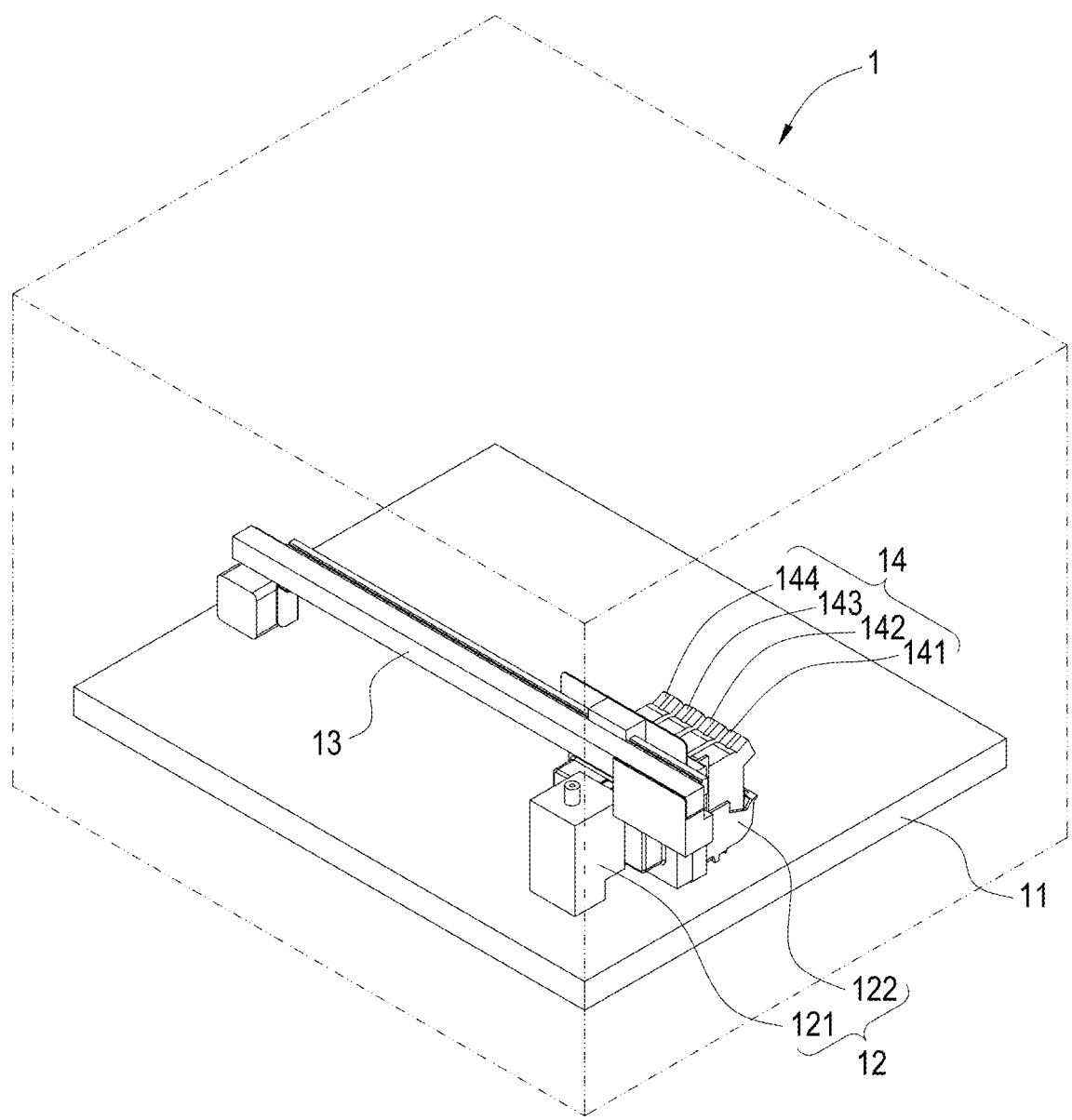
FIG. 1 is a schematic view of a 3D printer according to one embodiment of the present disclosure.

FIG. 1 is a schematic view of a 3D printer according to one embodiment of the present disclosure. One of the exemplary embodiments of the present invention discloses a printing method for color compensation of 3D printer (refers to as the method hereinafter), the method is adopted by a 3D printer as shown in FIG. 1 (refers to as the printer 1 hereinafter).

As illustrated in FIG. 1, the printer 1 may have a printing platform 11 and a nozzle module 12. In one embodiment, the nozzle module 12 comprises a 3D nozzle 121 for jetting material and a 2D nozzle 122 for jetting ink.

In this embodiment, the 3D nozzle 121 and the 2D nozzle 122 are arranged on same control stick 13. In particular, the 3D nozzle 121 and the 2D nozzle 122 may be respectively arranged on two opposite sides of one end of the control stick 13, and the printer 1 may move the 3D nozzle 121 and the 2D nozzle 122 through controlling the control stick 13. In another embodiment, the printer 1 may have multiple control sticks, and the 3D nozzle 121 and the 2D nozzle 122 may be arranged on different control sticks respectively.

When performing a printing action for a 3D model, the printer 1 controls the 3D nozzle 121 to jet the material on the printing platform 11, so as to print, layer-by-layer, a slicing object of each printing layer of a 3D object, and the printer 1 controls the 2D nozzle 122 to jet ink on each printed slicing object, so as to perform coloring on each slicing object. The present invention is to perform multiple times of coloring actions on same slicing object according to the following exemplary embodiments, so as to solve the problem in related art that the 2D nozzle 122 can only jet ink along same direction and causes uneven coloring on each slicing object.

More specifically, the 2D nozzle 122 may be arranged with multiple ink cartridges 14, each of the ink cartridges 14 respectively stores different colors of inks. In the embodiment of FIG. 1, the amount of the multiple ink cartridges 14 may be at least four, which comprises a first ink cartridge 141 for storing Cyan ink, a second ink cartridge 142 for storing Magenta ink, a third ink cartridge 143 for storing Yellow ink, and a fourth ink cartridge 144 for storing Black ink. In another embodiment, the multiple ink cartridges 14 may be arranged at other position of the printer 1. In this case, the 2D nozzle 122 may be arranged with multiple spraying heads (as the spraying heads 15 shown in FIG. 3A), wherein the amount of the multiple spraying heads equals to the amount of the multiple ink cartridges 14, and the multiple spraying heads are respectively connected with the multiple ink cartridges 14 through pipelines.

The ink cartridges 14 or spraying heads may be horizontal aligned upon the 2D nozzle 122. Furthermore, in this embodiment, the 2D nozzle 122 is basically jetting ink along the aligning direction of the ink cartridges or the spraying heads, so as to jet and to mix different colors of inks for obtaining specific colors which are needed.

Figure 2:
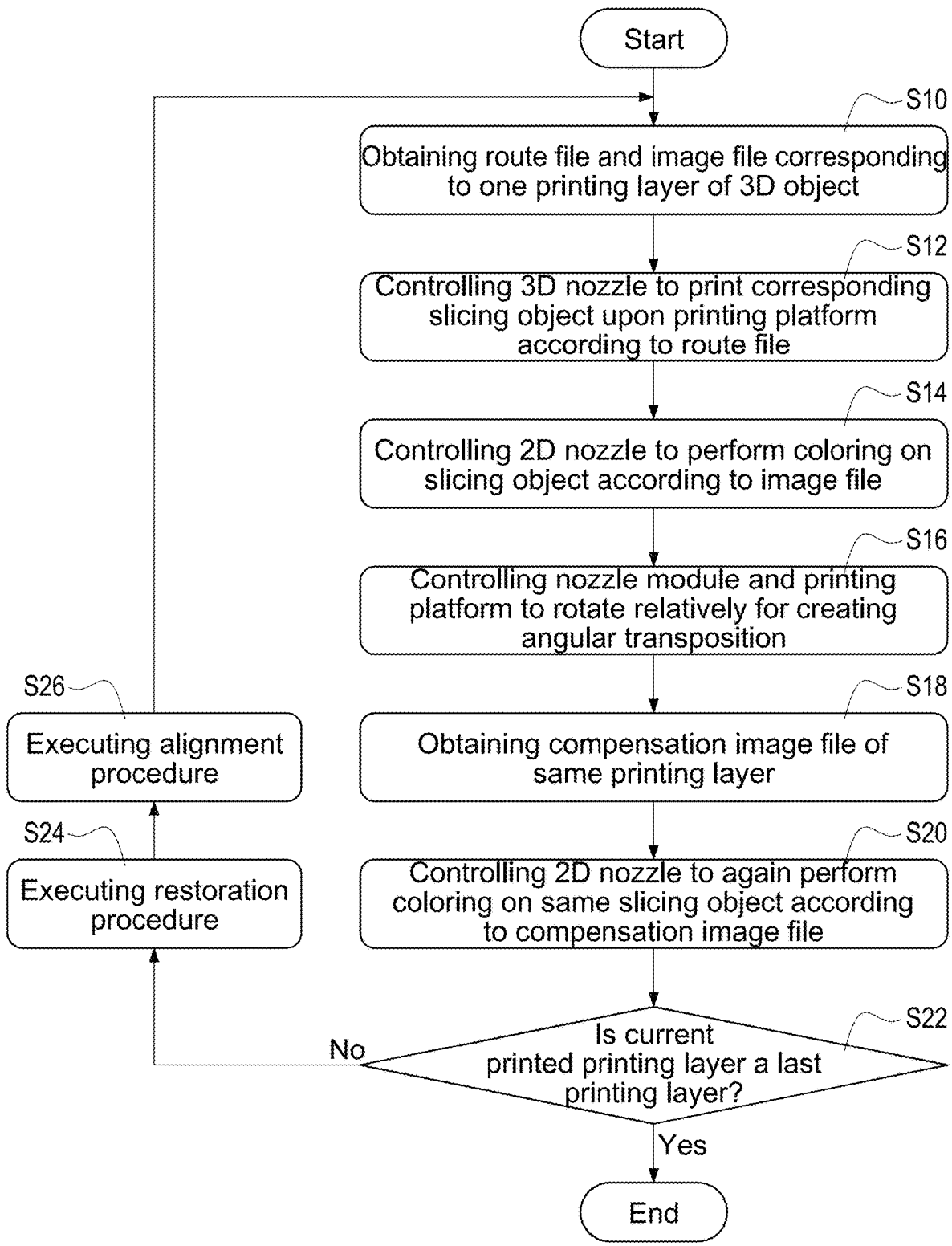
FIG. 2 is a printing flowchart according to one embodiment of the present disclosure.

FIG. 2 is a printing flowchart according to one embodiment of the present disclosure. Before printing a 3D object through the printer 1, the method may perform a slicing process to the 3D object through a processor of the printer 1 or through a computer (not shown), so as to slice the 3D object into multiple printing layers and obtains data related to each of the printing layers. In one embodiment, the processor may obtain respectively a route file and an image file corresponding to each of the printing layers after finishing the slicing process.

In particular, each printing layer of the 3D object has a corresponding route file and a corresponding image file, wherein the route file records object printing route information of a slicing object corresponding to the printing layer, and the image file records color printing route information of the slicing object corresponding to the said printing layer.

More specifically, after performing the slicing process to the 3D object, the processor may obtain the object printing route information and the color printing route information of each of the printing layers. In the aforementioned embodiments, the processor may output those route files and image files according to the object printing route information and the color printing route information, and the route files and the image files may be read and used by the printer 1 in the follow printing procedures.

In another embodiment, the processor may temporarily store the object printing route information and the color printing route information in the computer or a memory inside the printer 1 without generating and outputting the route files and the image files. In this scenario, the printer 1 may perform the follow printing procedures directly through the temporarily stored object printing rout information and color printing route information. The following discussion will give an example in the printer 1 to perform the printing procedures according to the actual output route files and image files.

As shown in FIG. 2, when printing a physical 3D model that corresponds to the 3D object, the printer 1 first obtains the route file and the image file corresponding to one of the printing layers of the 3D object (step S10). Next, the printer 1 controls the 3D nozzle 121 of the nozzle module 12 to move according to the route file, so as to print a slicing object corresponding to the printing layer upon the printing platform 11 (step S12). Next, the printer 1 further controls the 2D nozzle 122 of the nozzle module 12 to move according to the image file, so as to jet ink on the printed slicing object and performs coloring on the slicing object (step S14).

After the step S14, a first coloring action of the slicing object is completed. However, as mentioned above, there may be blind gaps remaining on the colored slicing object. For obviating the blind gaps from the slicing object, the printer 1 in this embodiment may perform a second coloring action on the slicing object along another direction.

As shown in FIG. 2, the printer 1 then controls the nozzle module 12 and the printing platform 11 to rotate relatively for creating a transposition with a specific angle between the nozzle module 12 and the printing platform 11 following step S14 (step S16). If the specific angle of the transposition is 90 degrees, the printer 1 may control the nozzle module 12 or the printing platform 11 to rotate 90 degrees alternatively, or the printer 1 may control the nozzle module 12 to rotate 45 degrees clockwise and controls the printing platform 11 to rotate 45 degrees counterclockwise, so as to create a 90 degrees transposition, but not limited thereto.

In one embodiment, after the rotation between the nozzle module 12 and the printing platform 11 is performed completely, the printer 1 may again control the 2D nozzle 122 of the nozzle module 12 to move and jets ink on the colored slicing object, so as to again perform coloring on the slicing object. Therefore, the aforementioned blink blind gaps may be obviated by performing multiple times of coloring actions to the same slicing object along different directions for compensating the color of the slicing object.

In particular, the 3D object in this embodiment may be a completely symmetrical object (such as a circle, a square, an equilateral triangle, etc.), and the printer 1 controls the nozzle module 12 to move and to jet ink for performing the second coloring action on the colored slicing object according to the same image file. Because the 3D object is a completely symmetrical object, even if the printer 1 uses same image file to control the 2D nozzle 122 to perform coloring along different directions, there won't be a position deviation.

In another embodiment (where the 3D object is not a completely symmetrical object), the printer 1 may obtain a compensation image file after the rotation between the nozzle module 12 and the printing platform 11 is performed completely (step S18), and controls the 2D nozzle 122 to move and to jet ink on the colored slicing object according to the compensation image file, so as to again perform coloring on the same slicing object (step S20).

More specifically, the image file records the color printing route information of the slicing object, and the color printing route information includes color information and coordinate information of each need-to-color point of the slicing object. In one embodiment, the compensation image file records the color information same as that of the image file, and the compensation image file further records an adjusted coordinate information, wherein the adjusted coordinate information is generated based on the specific angle of the rotation performed by the printer 1 in step S16.

In the embodiment shown in FIG. 2, the printer 1 performs two the second coloring actions to same slicing object of same printing layer according to step S16 to step S20. However, in other embodiments, the printer 1 may perform the coloring action on same slicing object of same printing layer more than two times through repeatedly executing step S16 to step S20, not limited thereto.

It should be mentioned that the 2D nozzle 122 may arbitrarily move along three directions composed of an X axis, a Y axis, and a Z axis of the printer 1 due to the structure of the printer 1, however, the arranged position of the multiple spraying heads of the 2D nozzle 122 is limited, so the 2D nozzle 122 can basically jet ink along one directly (detailed discussed in the following). If the printer 1 controlled the printing platform 11 to rotate the specific angle in step S16, the direction of the 2D nozzle 122 wasn't changed, so a jetting direction of the 2D nozzle 122 adopted in step S20 will be the same as that of the 2D nozzle 122 adopted in step S14.

On the other hands, if the printer 1 controlled the nozzle module 12 to rotate the specific angle in step S16, the direction of the 2D nozzle 122 had changed. In this scenario, the jet direction of the 2D nozzle 122 adopted in step S20 will not be the same as that of the 2D nozzle 122 adopted in step S14.

After step S20, the printer 1 determines whether the current printed printing layer is a last printing layer of the 3D object (step S22). Next, the printer 1 terminates the printing action when determining that the current printed printing layer is the last printing layer of the 3D object.

If the current printed printing layer is not the last printing layer of the 3D object, the printer 1 executes a restoration procedure to the nozzle module 12 and the printing platform 11 (step S24), so as to restore the angles and the positions of the nozzle module 12 and the printing platform 11 to their initial angles and initial positions. Next, the printer 1 may again execute step S10 to step S20 for printing next printing layer of the 3D object.

In particular, if the printer 1 controlled the nozzle module 12 to rotate in step S16, it needs to perform the restoration procedure to the nozzle module 12 in step S24. If the printer 1 controlled the printing platform 11 to rotate in step S16, it needs to perform the restoration procedure to the printing platform 11. Moreover, if the printer 1 controlled both the nozzle module 12 and the printing platform 11 to rotate simultaneously in step S16, then it needs to perform the restoration procedure to both the nozzle module 12 and the printing platform 11 in step S24.

It should be mentioned that this invention needs to adjust the angle and the position of the nozzle module 12 and/or the printing platform 11 for performing a second coloring action, as a consequence, after the restoration procedure of the nozzle module 12 and/or the printing platform 11, the printer 1 may selectively executes an alignment procedure to the 3D nozzle 121 or the 2D nozzle 122 (step S26). Therefore, the printer 1 can ensure that a coloring position of the 2D nozzle 122 is exactly corresponding to a printing position of the 3D nozzle 121, so as to improve the coloring accuracy of the printer 1.

Figure 3A:
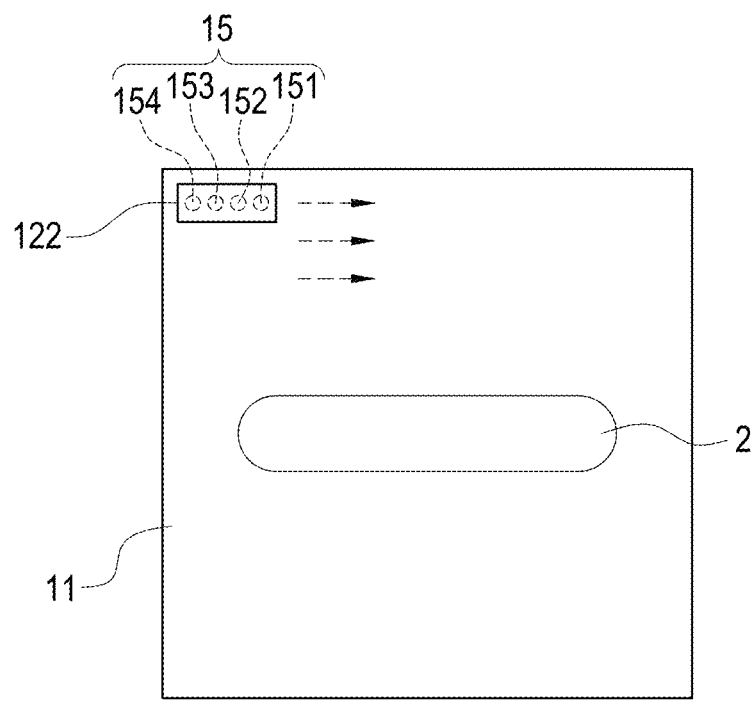
FIG. 3A is a schematic view showing a first printing direction according to a first embodiment of the present disclosure.
Figure 3B:
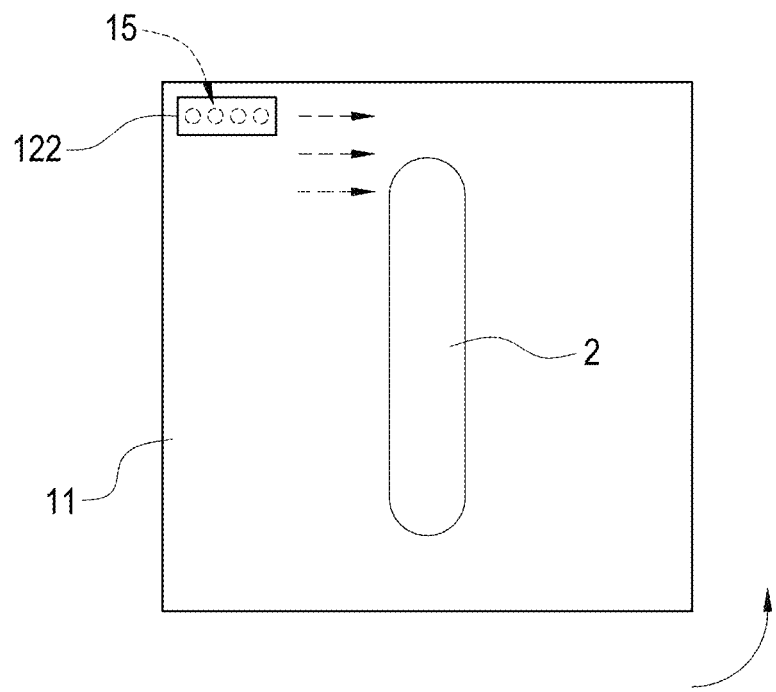
FIG. 3B is a schematic view showing a second printing direction according to a second embodiment of the present disclosure.
Figure 3C:
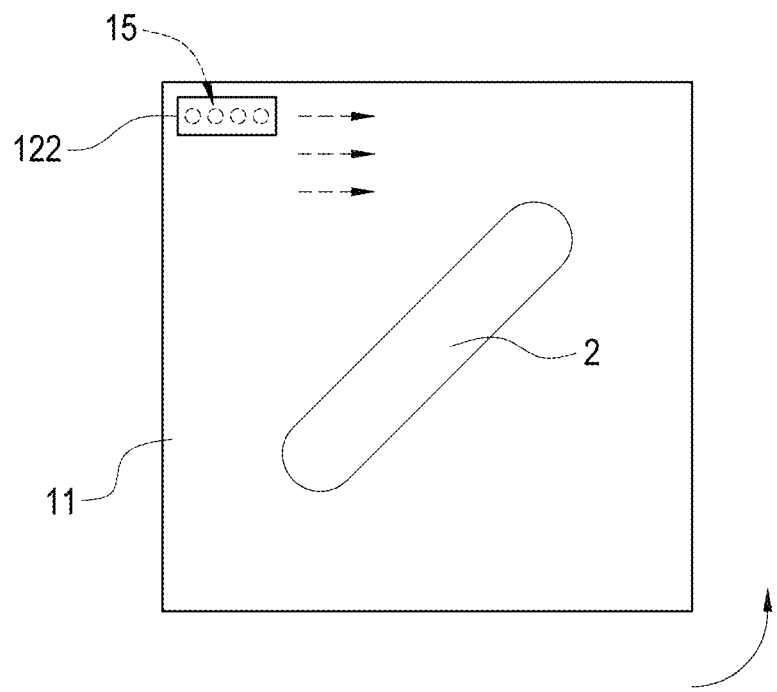
FIG. 3C is a schematic view showing a second printing direction according to a third embodiment of the present disclosure.
Figure 3D:
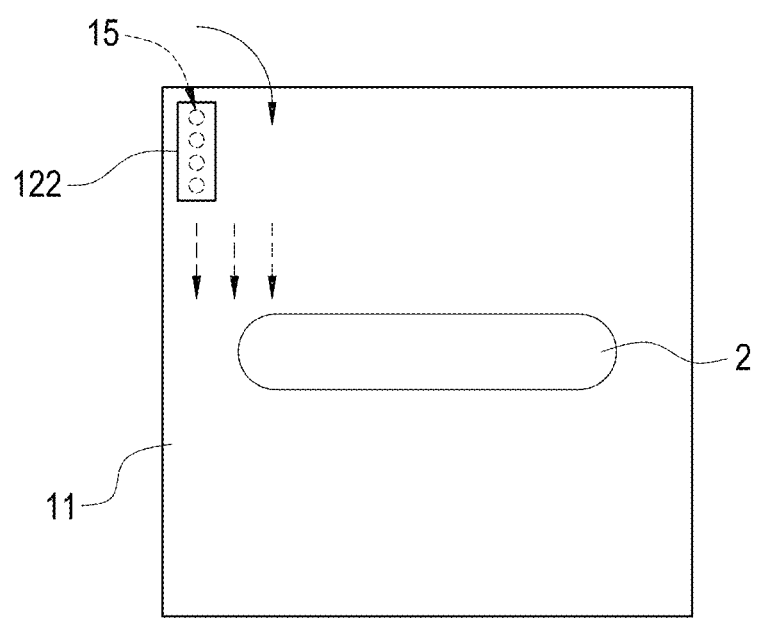
FIG. 3D is a schematic view showing a second printing direction according to a fourth embodiment of the present disclosure.
Figure 3E:
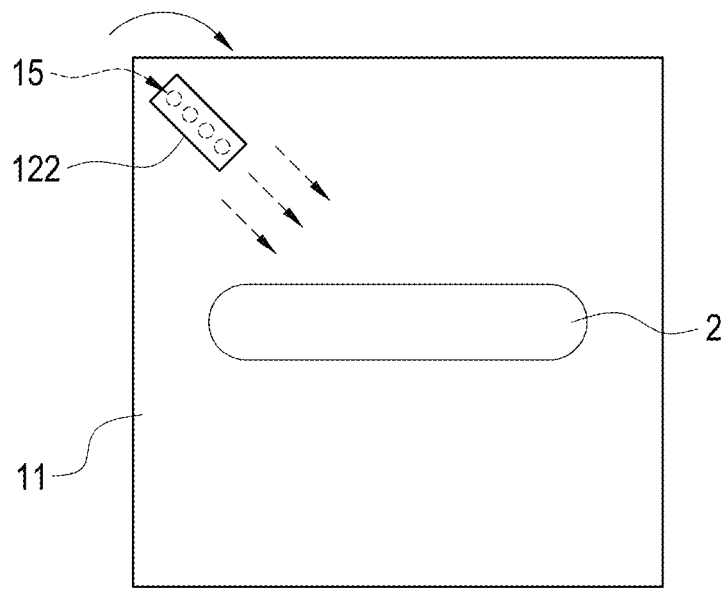
FIG. 3E is a schematic view showing a second printing direction according to a fifth embodiment of the present disclosure.

Please refer to FIG. 3A to FIG. 3E, wherein FIG. 3A is a schematic view showing a first printing direction according to a first embodiment of the present disclosure, FIG. 3B is a schematic view showing a second printing direction according to a second embodiment of the present disclosure, FIG. 3C is a schematic view showing a second printing direction according to a third embodiment of the present disclosure, FIG. 3D is a schematic view showing a second printing direction according to a fourth embodiment of the present disclosure, and FIG. 3E is a schematic view showing a second printing direction according to a fifth embodiment of the present disclosure.

In one embodiment, the 2D nozzle 122 may be arranged with multiple spraying heads 15, in particular, the multiple spraying heads 15 may include a first spraying head 151 for jetting Cyan ink, a second spraying head 152 for jetting Magenta ink, a third spraying head 153 for jetting Yellow ink, and a fourth spraying head 154 for jetting Black ink.

As shown in FIG. 3A, the printer 1 may control the 2D nozzle 122 to move upon the printing platform 11, and to jet ink on a slicing object 2 printed by the 3D nozzle 121, so as to perform a first coloring action on the slicing object 2. In the embodiment of FIG. 3A, the four spraying heads 15 of the 2D nozzle 122 is horizontal aligned, and the 2D nozzle 122 may jet ink along an aligning direction of the four spraying heads 15 (i.e., the jetting direction of the 2D nozzle 122 equals to the aligning direction of the four spraying heads 15).

In the embodiment of FIG. 3B, the printer 1 controls the printing platform 11 to rotate 90 degrees after the first coloring action is completed, and then controls the 2D nozzle 122 to perform a second coloring action on the slicing object 2 printed on the printing platform 11. In this embodiment, the direction of the 2D nozzle 122 wasn't changed, so the jetting direction of the 2D nozzle 122 is not changed as well. In other words, the jetting direction of the 2D nozzle 122 adopted for the second coloring action will be the same as the jetting direction of the 2D nozzle 122 adopted for the first coloring action in this embodiment.

In the embodiment of FIG. 3C, the printer 1 controls the printing platform 11 to rotate 45 degrees after the first coloring action is completed, and then controls the 2D nozzle 122 to perform a second coloring action on the slicing object 2 printed on the printing platform 11. In this embodiment, the direction of the 2D nozzle 122 wasn't changed, so the jetting direction of the 2D nozzle 122 adopted for the second coloring action will be the same as the jetting direction of the 2D nozzle 122 adopted for the first coloring action in this embodiment.

It should be mentioned that if the printer 1 controlled the printing platform 11 to rotate 90 degrees clockwise or counterclockwise for performing the second coloring action, the processor doesn't need to generate the compensation image file when performing the slicing process to the 3D object.

In one embodiment, the printer 1 may perform a rotating process to the image file of the slicing object before performing the second coloring action, to directly obtain the compensation image file. In this embodiment, the rotating process uses the coordinate information (such as a coordinate matrix) of the image file to multiply by a rotation matrix (such as a 90 degrees rotation matrix or a 270 degrees rotation matrix), so as to achieve the rotation effect for the image file. In another embodiment, the printer 1, when performing the first coloring action, may read the color information and the coordinate information of the image file by using "row" as a reading unit. Next, the printer 1, when performing the second coloring action, may read the color information and the coordinate information of the same image file by using "column" as the reading unit. Therefore, the 90 degrees' angle difference or the 270 degrees' angle difference of the image file may be compensated.

As mentioned above, if the printer 1 controlled the printing platform 11 to rotate any angle other than 90 degrees for performing the second coloring action, the processor needs to generate the compensation image file when performing the slicing process to the 3D object (detailed discussed in the following).

In the embodiment of FIG. 3D, the printer 1 controls the nozzle module 12 (or only controls the 2D nozzle 122 thereon) to rotate 90 degrees after the first coloring action, and the printer 1 then controls the rotated 2D nozzle 122 to perform the second coloring action on the slicing object 2. In this embodiment, the direction of the 2D nozzle 122 has changed after the first coloring action, thus the jetting direction of the 2D nozzle 122 has changed as well. In other words, the jetting direction of the 2D nozzle 122 for performing the second coloring action as shown in FIG. 3D is different from the jetting direction of the 2D nozzle 122 for performing the first coloring action as shown in FIG. 3A.

In the embodiment of FIG. 3E, the printer 1 controls the nozzle module 12 (or only controls the 2D nozzle 122 thereon) to rotate 45 degrees after the first coloring action, and the printer 1 then controls the rotated 2D nozzle 122 to perform the second coloring action on the slicing object 2. In this embodiment, the direction of the 2D nozzle 122 has changed after the first coloring action, so the jetting direction of the 2D nozzle 122 for performing the second coloring action as shown in FIG. 3E is different from the jetting direction of the 2D nozzle 122 for performing the first coloring action as shown in FIG. 3A.

Similarly, if the printer 1 controlled the 2D nozzle 122 to rotate 90 degrees clockwise or counterclockwise for performing the second coloring action, the processor doesn't need to generate the compensation image file when performing the slicing process. On the other hand, if the printer 1 controlled the 2D nozzle 122 to rotate any degree other than 90 degrees for performing the second coloring action, the processor needs to generate the compensation image file when performing the slicing process.

In the present disclosure of the invention, the rotate target (which is the nozzle module 12 or the printing platform 11) and the specific angle of the rotation may be default set by the manufacturer, or may be manually set by the user, not limited thereto.

Figure 4:
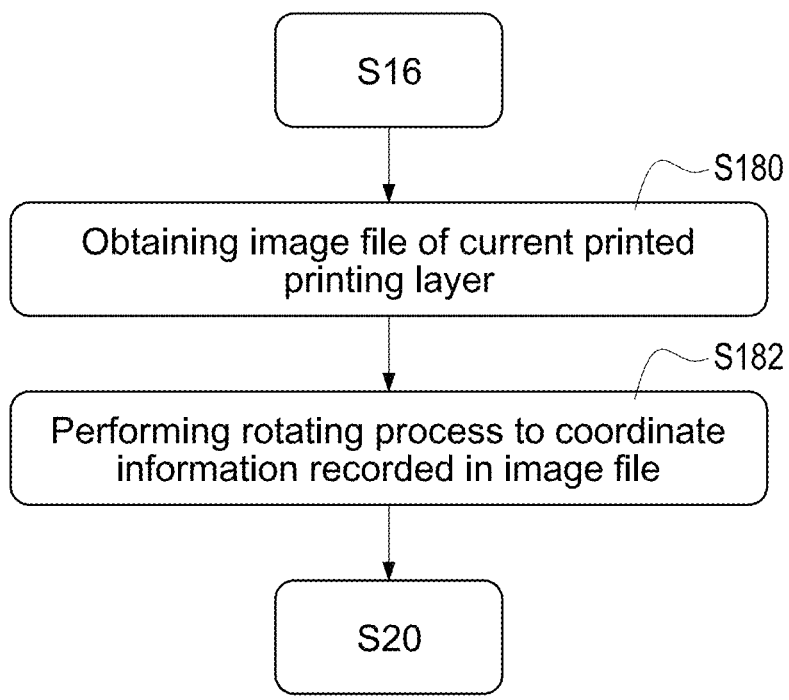
FIG. 4 is a flowchart for reading image file according to one embodiment of the present disclosure.

Please refer to FIG. 2 and FIG. 4 simultaneously, wherein FIG. 4 is a flowchart for reading image file according to one embodiment of the present disclosure. The flowchart of FIG. 4 is used to detailed discuss step S18 of FIG. 2, which describes how the nozzle module 12 performs the second coloring action based on same image file if a rotation angle relatively rotated between the nozzle module 12 and the printing platform 11 is 90 degrees.

As shown in FIG. 4, after the printer 1 controls the nozzle module 12 and the printing platform 11 to relatively rotate 90 degrees following the aforementioned step S16, the printer 1 further obtains the image file of the current printed printing layer (step S180). Next, the printer 1 performs a rotating process to the coordinate information recorded in the image file (step S182), so as to generate the compensation image file. Therefore, the printer 1 may dynamically calculate and generate the compensation image file based on the original image file during its printing procedure, thus the work loading of the processor in performing the slicing process will be reduced.

In particular, after the rotating process, the printer 1 may generate the compensation image file according to the rotated coordinate information and then outputs the compensation image file, or the printer 1 may only temporarily store the rotated coordinate information in a memory for being read when performing the second coloring action, not limited thereto.

Figure 5:
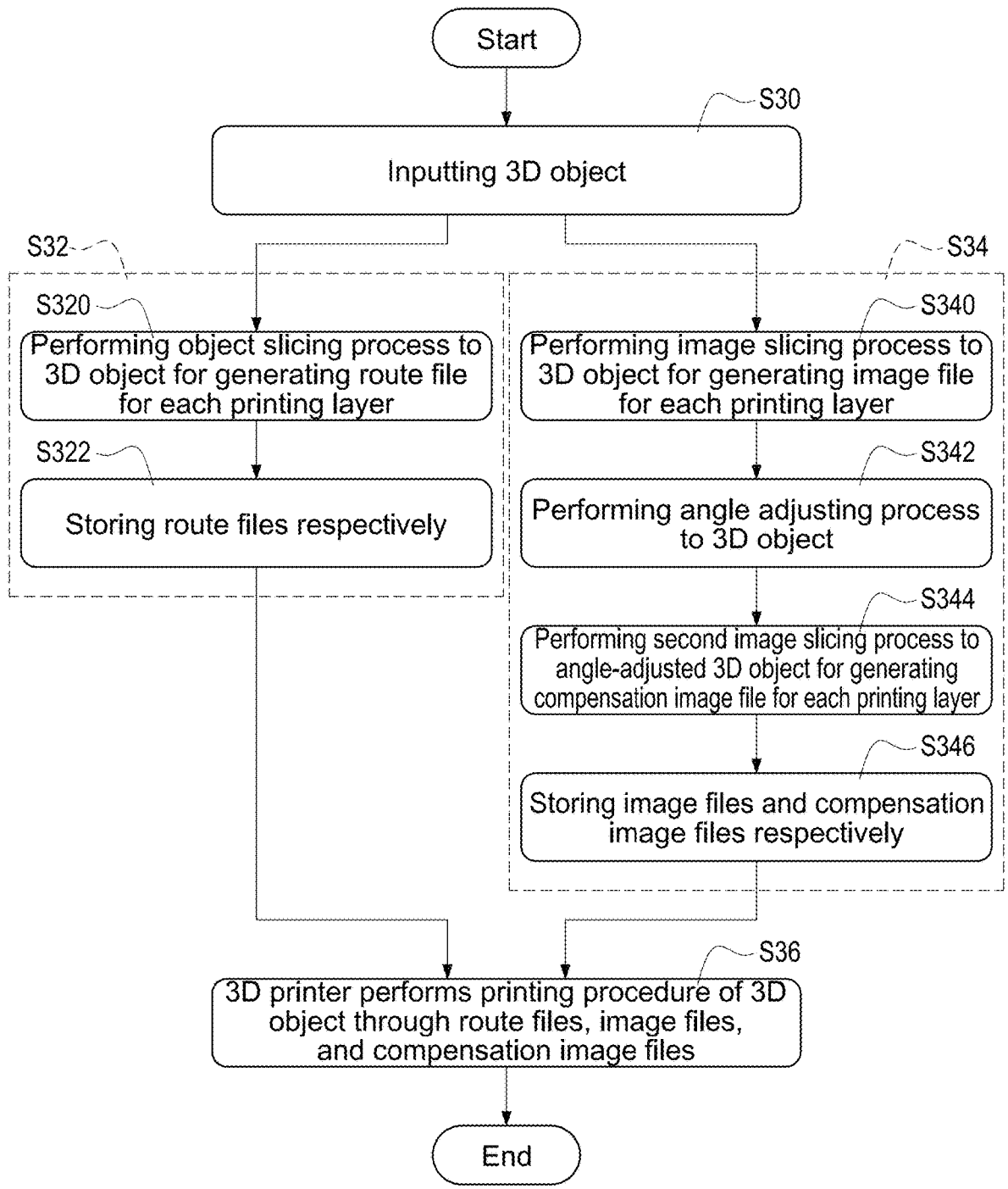
FIG. 5 is a slicing flowchart according to one embodiment of the present disclosure.
Figure 6:
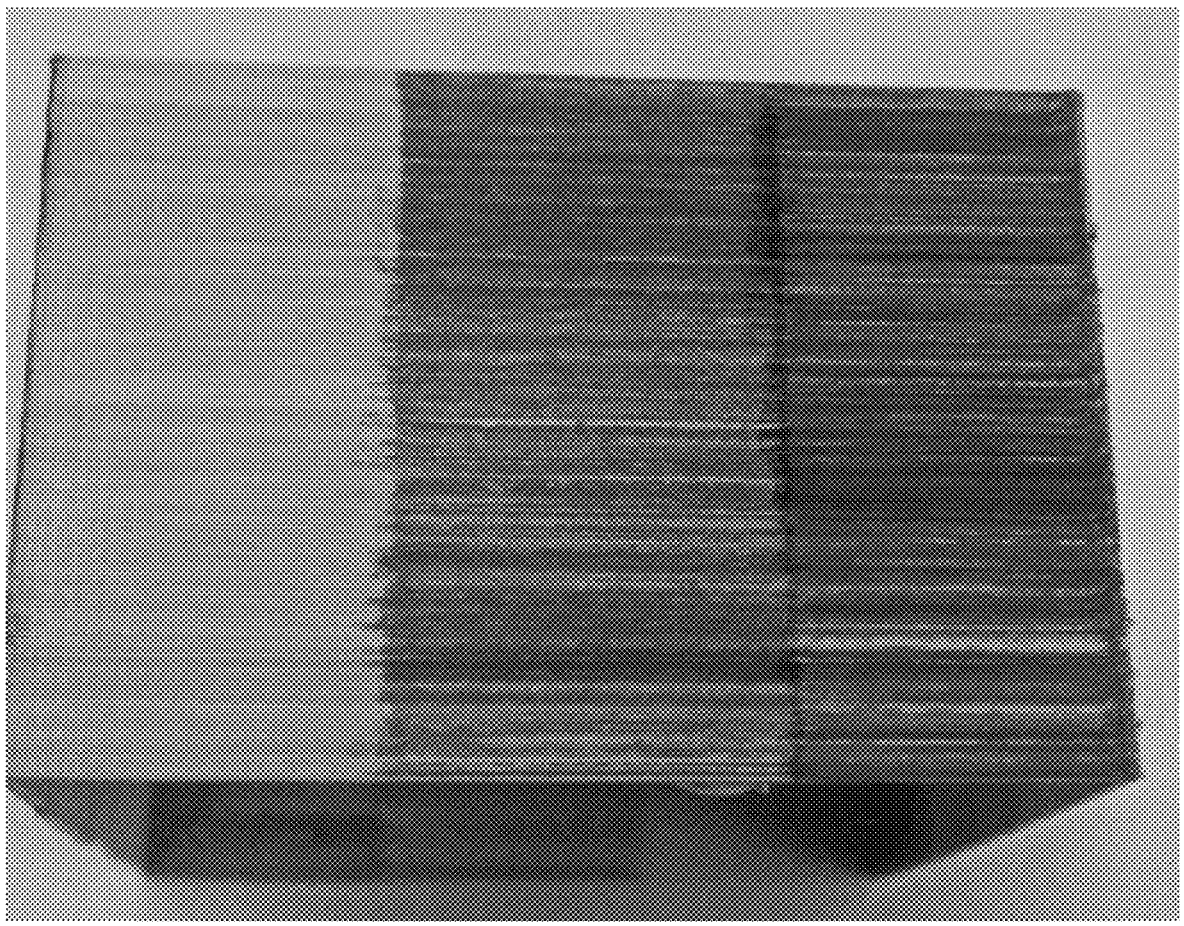
FIG. 6 is a schematic view showing a full-colored 3D model colored by ink nozzle along X axis
Figure 7:
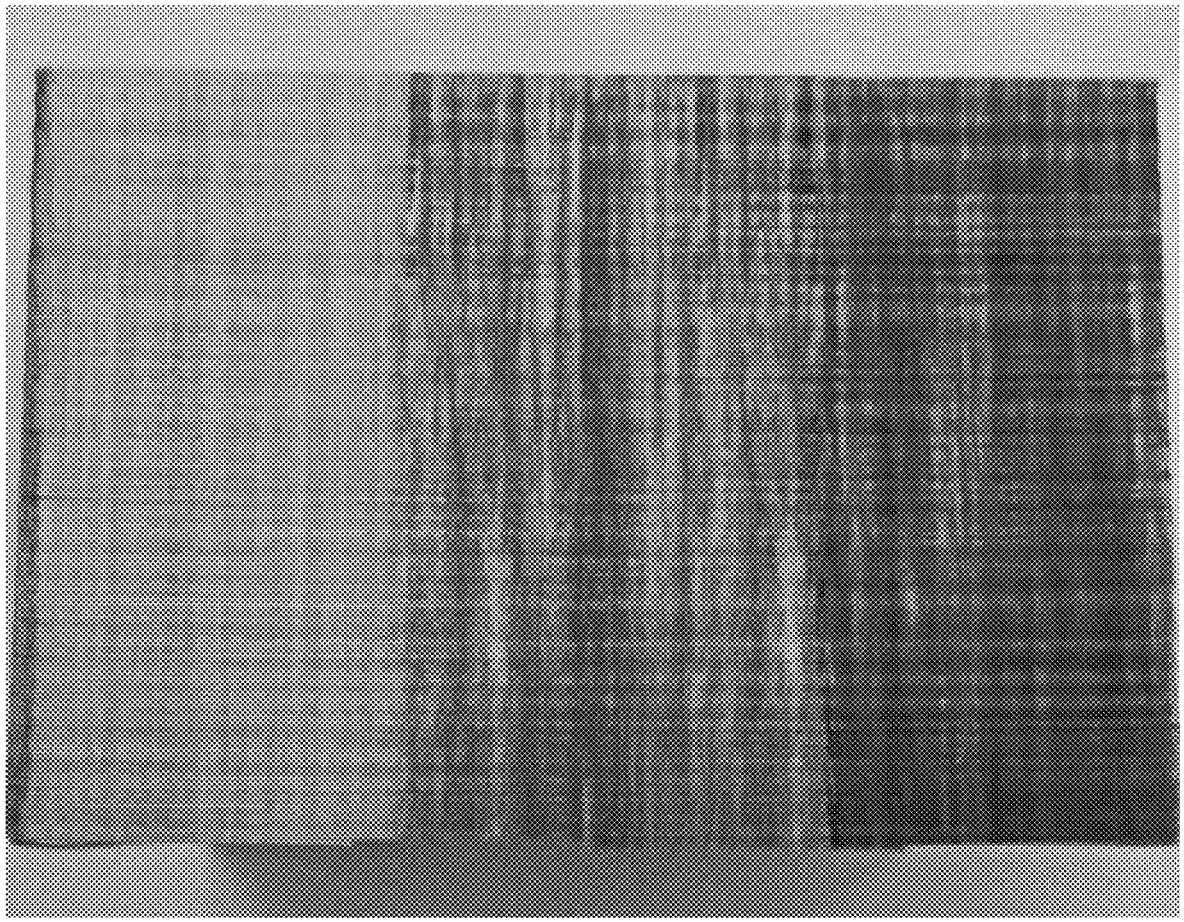
FIG. 7 is a schematic view showing another full-colored 3D model colored by ink nozzle along Y axis.

FIG. 5 is a slicing flowchart according to one embodiment of the present disclosure. FIG. 5 is used to discuss how the processor generates the compensation image file when performing the slicing process.

As discussed, if a rotation angle relatively rotated between the printing platform 11 and the nozzle module 12 is not 90 degrees, the coordinate information of the compensation image file may not be dynamically calculated and generated based on the coordinate information of the original image file, it results in that the processor needs to generate the compensation image file for each printing layer of the 3D object simultaneously when performing the slicing process to the 3D object.

As shown in FIG. 5, first, the processor inputs the 3D object that a user wants to print (step S30), then the processor performs an object slicing process to the 3D object (step S32), and also performs an image slicing process to the 3D object (step S34). In one embodiment, the processor may first perform the object slicing process or the image slicing process alternatively. In another embodiment, the processor may perform both the object slicing process and the image slicing process simultaneously through a multiplexing manner, not limited thereto.

Additionally, the processor performs the object slicing process to the 3D object for generating the route files for each of the multiple printing layers (step S320), wherein each of the route files respectively records object printing-route information of each of the printing layers. After the step S320, the processor stores the route files respectively for being used by the printer 1 while performing the following printing procedure (step S322).

Additionally, the processor performs the image slicing process to the 3D object for generating the image files for each of the multiple printing layers (step S340), wherein each of the image files respectively records color printing information of each of the printing layers. Next, the processor performs an angle adjusting process to the 3D object through an angle editor (step S342), and then again performs the image slicing process to the angle-adjusted 3D object (which is a second image slicing process), so as to generate the compensation image files for each of the multiple printing layers (step S344). In this embodiment, each of the compensation image files respectively records compensating color printing information of each of the printing layers.

The aforementioned angle editor may be implemented by hardware or software, not limited thereto. In step S342, the angle editor is to rotate the 3D object a specific angle, wherein the specific angle equals to a rotation angle relatively rotated between the nozzle module 12 and the printing platform 11 performed by the printer 1 for the second coloring action in the following procedure.

After completing the aforementioned object slicing process and the image slicing process, each printing layer of the 3D object has a corresponding one of the route files, a corresponding one of the image files, and a corresponding one of the compensation image files. In particular, if the printer 1 decides to perform n times of the coloring action on each printing layer of the 3D object, the amount of the compensation image file generated for each printing layer will be n−1.

After step S344, the processor respectively stores the image files and the compensation image files respectively for being used by the printer 1 while performing the following printing procedure (step S346).

It should be mentioned that the method of the present invention is to perform at least two times of the coloring action on each slicing object of each printing layer, so the color of each slicing object may be a bit different from the color recorded in the color information of the image file. In the embodiment, the processor may further perform a color weakening process to the color information of the image file and compensation image file in aforementioned step S340 and step S344. Therefore, the color of each slicing object is assured, by the color weakening process, in matching with the original-edited color of the 3D object after the multiple times of coloring action.

After step S32 and step S34, the printer 1 may perform the printing procedure of the 3D object through the stored route files, the image files, and the compensation image files (step S36).

The method of the present invention may perform multiple times of coloring action on each slicing object along different directions, so as to ensure the color of a completed full-colored 3D model more evenly, and prevent blind gaps from being created and affects the appearance of the full-colored 3D model.

As the skilled person will appreciate, various changes and modifications can be made to the described embodiment. It is intended to include all such variations, modifications and equivalents which fall within the scope of the present invention, as defined in the accompanying claims.

What is claimed is:

1. A printing method by a 3D printer having a nozzle module and a printing platform, comprising:
    a01) inputting a 3D object by a processor;
    a02) performing an image slicing process to the 3D object for generating image files of a plurality of printing layers, and performing a color weakening process to color information recorded in the image files;
    a03) performing an angle adjusting process to the 3D object by an angle editor to rotate the 3D object for a specific angle;
    a04) performing the image slicing process to the angle-adjusted 3D object for generating compensation image files of the plurality of printing layers, and performing the color weakening process to color information recorded in the compensation image files;
    a) obtaining a route file and the image file of one of the plurality of printing layers of the 3D object;
    b) controlling a 3D nozzle of the nozzle module to move and to print a slicing object corresponding to the printing layer upon the printing platform according to the route file;
    c) controlling a 2D nozzle of the nozzle module to move and to jet ink on the printed slicing object for a first time of performing coloring on the slicing object along a first direction upon the slicing object according to the image file for generating a colored slicing object;
    d) controlling the nozzle module and the printing platform to relatively rotate by a rotation angle for generating an angular transposition, wherein the rotation angle equals to the specific angle of the angle adjusting process; and
    e) controlling the 2D nozzle to move again and to jet ink on the colored slicing object for a second time along a second direction upon the colored slicing object according to the compensation image to obviate blind gaps of the colored slicing object that are made at the first time of performing coloring on the slicing object after step d), wherein the second direction is different from the first direction, and a color of the ink applied to the colored slicing object at the first time is the same as the color of the ink applied to the colored slicing object at the second time.

2. The printing method in claim 1 further comprising a step following step d:
    d1) obtaining the compensation image file of the printing layer;
    wherein, step e is to control the 2D nozzle to move and to jet ink on the slicing object for again performing coloring on the slicing object according to the compensation image file.

3. The printing method in claim 2, wherein step d is to control the nozzle module or the printing platform to rotate 90 degrees clockwise or counterclockwise.

4. The printing method in claim 2 further comprising a step before step a:
    a05) performing an object slicing process to the 3D object for respectively generating the route file of each of the printing layers.

5. The printing method in claim 1, wherein step d is to control the nozzle module to rotate the specific angle, and a jetting direction of the 2D nozzle adopted in step c is different from another jetting direction of the 2D nozzle adopted in step e.

6. The printing method in claim 1, wherein step d is to control the printing platform to rotate the specific angle, and a jetting direction of the 2D nozzle adopted in step c equals to another jetting direction of the 2D nozzle adopted in step e.

7. The printing method in claim 1 further comprising following steps:
    f) determining whether the printing layer is a last printing layer of the 3D object;
    g) executing a restoration procedure to the nozzle module or the printing platform when determining the printing layer is not the last printing layer; and
    h) re-executing step a to step g for printing next printing layer of the 3D object following step g.

8. The printing method in claim 7 further comprising a step:
    g1) performing an alignment procedure to the 3D nozzle or the 2D nozzle following step g.

9. The printing method in claim 1, wherein the 2D nozzle is arranged with at least four spraying heads for respectively jetting Cyan ink, Magenta ink, Yellow ink, and Black ink.

10. The printing method in claim 9, wherein the at least four spraying heads are horizontal aligned, and the 2D nozzle jets ink along an aligning direction of the at least four spraying heads.

* * * * *